Figure 5:
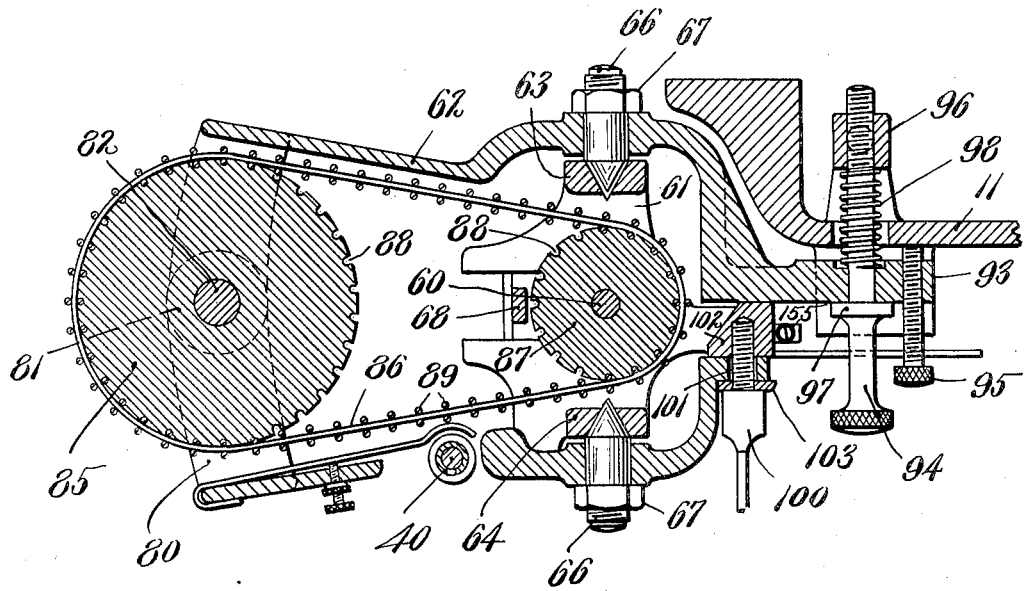

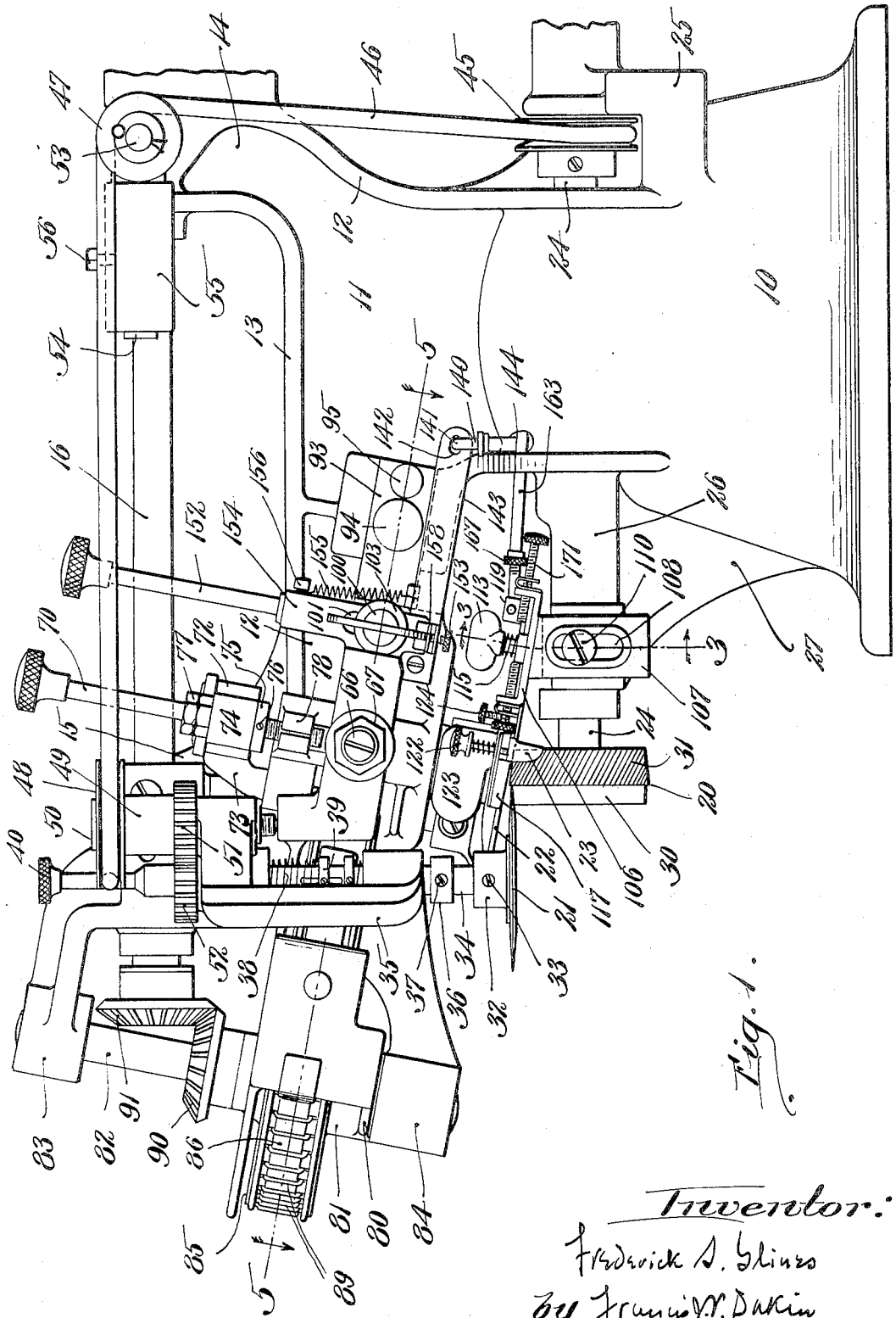

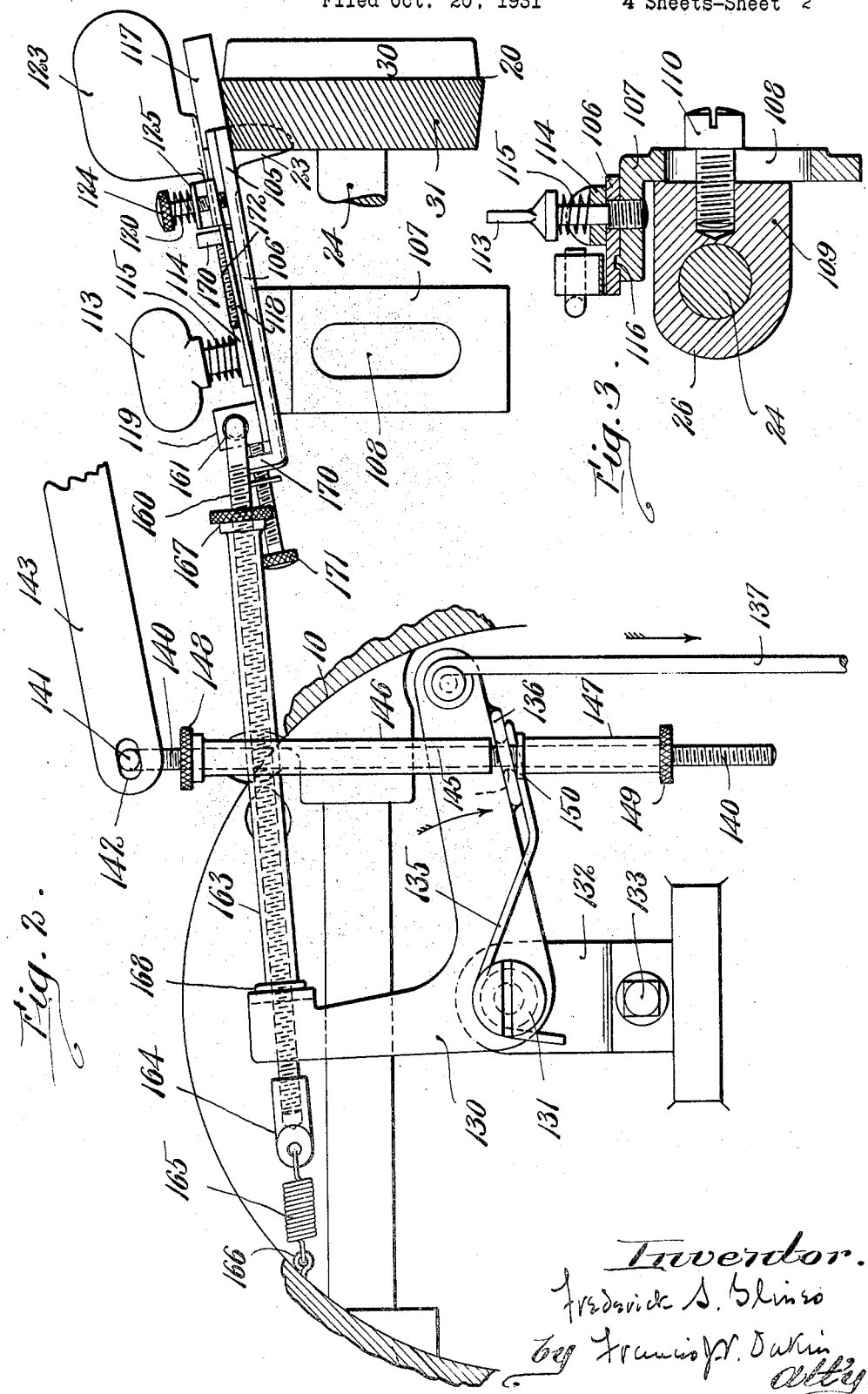

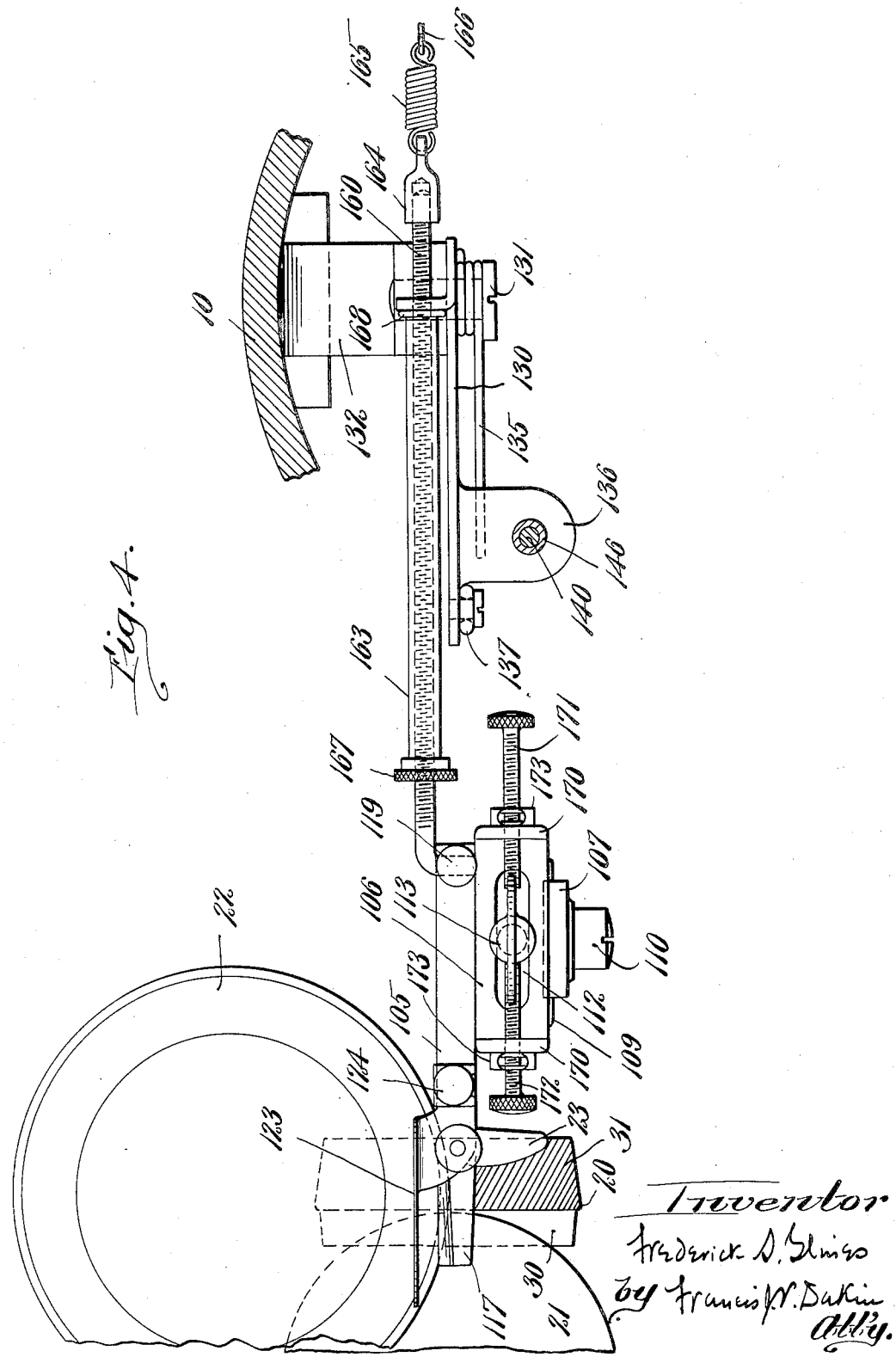

Patented May 15, 1934

1,959,202

UNITED STATES PATENT OFFICE 1,959,202

SKIVING MACHINE

Frederick S. Glines, Lynn, Mass.

Application October 20, 1931, Serial No. 569,920

19 Claims. (Cl. 69—16)

This invention relates to skiving machines and more particularly to means for adjusting the cutting disk and the work guiding member in machines of this character.

In the use of skiving machines in the shoe industry for skiving the edges of leather and other materials, the width and slope of the skived edge varies, dependent upon whether the edge is to be folded or stitched to another edge or otherwise treated. When the edge is to be folded, the material is given a "full" or wide skiving to a thin edge but when it is to be secured to another edge, by stitching or otherwise, the work is subjected to a partial or narrower skiving. In skiving machines to accomplish these results, the cutting member is so mounted that its cutting angle may be adjusted to vary the slope of the skived edge and the edge gage for guiding the work through the machine is likewise adjustable transversely of the edge of the work to regulate the width of the skiving. These members have heretofore been so constructed, however, that the adjustments have to be made while the machine is at rest and after being made remain fixed until new adjustments are made.

When each piece of work is to be provided with skived edges of different character, however, which frequently happens in the case of shoe upper parts, a number of handlings of each piece is required, since the machine will require adjustment for each different type of skiving. For example, if a certain edge of a shoe part is to be folded and another edge is to be stitched to another shoe part, then that work will have to be run through the machine twice, the machine being first adjusted to each type of skiving. With the work coming to the machine in lots of several dozen or more shoe parts, each lot to be finished before the next lot is started, it will be appreciated that a considerable amount of time and effort is expended in adjusting the machine from one type of skiving to the other.

One of the important objects of my invention is the provision of means whereby a skiving machine may, at the will of the operator, be instantaneously adjusted from one type of skiving to another type and vice versa in order that a piece of work requiring skiving of two kinds may be completed in one operation.

Another object is the provision of means capable of being operated by a foot treadle in order to leave the hands of the operator free to hold the work.

A further object is the provision of means which may be used for changing the adjustment of both the cutting or skiving and the edge gage or work guiding members of a skiving machine simultaneously or either one of them alone or which may be disconnected entirely.

Other objects of the invention will be more specifically described and pointed out hereinafter.

My invention contemplates the provision in a skiving machine of a cutting member mounted for free angular adjustment in relation to the work and an edge gage movable transversely of the work, and treadle operated means for changing the adjustment of both to suit varying conditions of work. I accomplish this end by providing for each member a pair of stops between which each member may be moved by treadle operated means at the will of the operator and, if desired, without stopping the machine. Preferably, each member is normally held against one of the stops by resilient means, such as a spring, and the treadle operated means is utilized for moving each member away from its normal position and against the other stop of its respective pair. When the pressure on the treadle is released, the springs or other resilient means return the members to their normal position.

The stops are adjustable to regulate the length of the paths of adjustment of both members and also the location of each path.

Another feature of my invention resides in the provision of treadle operated means which may be disconnected by the operator instantly and without appreciable effort from either both of said members or from either one of them whenever the conditions of work warrant it. This permits the machine to be used when so desired with the two members or either one of them in fixed adjustment.

Another feature of the invention resides in so constructing the treadle operated means that one treadle may be employed for changing the adjustment of both members simultaneously even though the paths of movement of said two members may be of different lengths.

In the accompanying drawings illustrating one embodiment of my invention, Figure 1 is a front side elevation as viewed from the operator's seat of a skiving machine of the general type shown in United States Letters Patent #220,906, to Amazeen, dated October 28, 1879, having my invention applied thereto; Fig. 2 is a rear side elevation on an enlarged scale of certain portions of the frame of the machine showing an edge gage constructed in accordance with my invention and treadle operated means for varying the adjustment of the cutting member and the said edge gage;

Fig. 3 is a cross sectional view upon an enlarged scale on line 3—3 in Fig. 1; Fig. 4 is a plan view also on an enlarged scale showing the edge gage and treadle operated means; and Fig. 5 is a transverse sectional view on line 5—5 in Fig. 1 looking downwardly showing the cutting member and means for rotating it.

For the purpose of illustrating the principle and mode of operation of my invention, I have shown it as applied to a skiving machine of the general type shown in the said Amazeen patent, hereinbefore referred to, but it is to be understood that the invention is not to be limited to that particular form of machine since it may, with slight changes which would be apparent to one skilled in the art, be applied to various other types of skiving machines.

Referring to Figure 1 of the drawings in which is shown a machine of the Amazeen type, the frame of the machine comprises a hollow dome-shaped base 10 having its top extended upwardly and laterally to one side to form a horizontal web arm 11 reenforced by end and top flanges 12 and 13. At its two ends, the arm is provided with upwardly extending arms 14 and 15 in which is rotatably mounted in suitable bearings a main shaft 16.

The operating instrumentalities comprise a feed roll 20, which also serves as a support for the work, a pressure disk 21 for holding the work in engagement with the feed roll, a cutting or skiving member 22 and an edge gage 23 for guiding the work through the machine.

The feed roll 20 is fixed on one end of a shaft 24 rotatably mounted in suitable bearings carried by a right angled arm 25 and a cylindrical portion 26 supported by a web 27. These parts are arranged on opposite sides of the base 10 and are preferably parts of the frame casting. The shaft 24 on its rear end is provided with a pulley wheel (not shown) whereby it is driven independently of the main shaft by a bench transmitter of any suitable construction. Since the feeding of the work through the machine requires the feed roll to be rotated at a relatively slow speed as compared with the speed of the main shaft, it is preferable to provide independent means for operating shaft 24. The periphery of the feed roll is divided longitudinally into a smooth portion 30 and a knurled oblique portion 31, the former portion being slightly countersunk in relation to the latter portion.

The presser disk 21 is a thin disk having a hub portion 32 whereby it is fastened by a screw 33 to the lower end of a vertical shaft 34 rotatably mounted in the two ends of a depending yoked bracket 35 which is integral at its upper end with the extension 15 of the arm 11. The shaft 34 is longitudinally slidable in the bracket 35 to permit the presser disk to yield upwardly when feeding the work but to prevent engagement between the presser disk and the cutting member, a collar 36 is adjustably fastened by a screw 37 to the shaft to serve as a stop for limiting the upward movement of said shaft. A helical spring 38 on the shaft 34, abutting at its upper end the upper part of the bracket 35 and at its lower end a collar 39, forces the shaft downwardly to hold the presser disk in engagement with the work. The collar 39 is vertically adjustable on the shaft 34 to regulate the downward pressure exerted by the spring 38 and this adjustment is accomplished by manipulation of a thumb screw 40 rotatably mounted on the upper end of the shaft which operates by well-known means to accomplish this end, which means it is unnecessary to describe.

The feeding of the work through the machine is accomplished by the cooperative action of the feed roll and the presser disk and to rotate the latter at the same speed as the former, the following means is provided. A belt pulley 45 is fixed on the shaft 24 over which travels an endless belt 46, directed by a pair of idler shives 47 to a pulley 48 formed on a sleeve 49 rotatably mounted on an upright stud shaft 50 set in the upper arm of the yoked bracket 35. The lower end of the sleeve is in the form of a gear 51 which meshes with a gear 52 fixed on the presser disk shaft 34. The shaft 24 therefore rotates both the feed roll and the presser disk at the same speed.

The idler shives 47 are rotatably mounted on a short shaft 53 carried crosswise in the enlarged end of a stud shaft 54 mounted in a cylindrical portion 55 of the extension 14 of the frame and to tighten the belt the latter shaft may be adjusted longitudinally in its bearing and secured in position by a set nut 56.

The cutting member 22 which is skeleton in form comprising a disk having its center removed, is held between a pair of circular plates fixed on the lower end of a shaft 60 slightly inclined from the vertical, which shaft is adapted to be rotated at a very high speed from the main shaft of the machine. The shaft 60 is rotatably mounted in an irregularly shaped bearing 61 which is pivotally mounted (Fig. 5) in one end of a fiddle frame 62, so termed from its general shape. The bearing 61 has two opposite side portions turned upwardly to form ears 63 and 64, each having a bevelled through and through opening adapted to receive the conical point of a screw 66 threaded through one side of the fiddle frame 62 whereby the bearing is pivotally supported in said frame and is capable of oscillation on said screws as centers in a vertical path approximately parallel with the longitudinal axis of the machine in order to vary the angular adjustment of the cutting member. A set nut 67 holds each screw 66 in adjusted position in the side of the frame.

From the base portion of the bearing 61 as shown in Fig. 5 there springs upwardly a portion 68 the end 69 of which is bent over to form a bearing for the cutting disk shaft, so that that shaft is supported both in the base and in said end. In order to adjust the cutting disk vertically, the shaft 60 is longitudinally movable in its bearings by manipulation of an adjusting screw 70. Locked on the upper end of the shaft 60 is a bearing 72 containing ball bearings and a thrust nut. The bearing 72 is provided with a downturned member 73 square in cross section which loosely fits a square opening in the upright portion 68 of the bearing 61. The adjusting screw 70 is used for raising and lowering the end bearing 72 in which the shaft is locked which thereby adjusts the shaft and the cutting member vertically. For this purpose the bearing is provided with a lateral bored ear 74 in which the adjusting screw is locked by a collar 75 fastened thereto by a screw 76 and a nut 77. The lower threaded end of the screw 70 is threaded through a lateral ear 78 on the upright portion 68. The turning of the adjusting screw raises or lowers the bearing 72 and the shaft 60.

The fiddle frame 62 which contains means for rotating the cutting member is pivotally mounted at its outer end so that its inner end swings laterally to permit adjustment of the cutting member in relation to the work gage. The two sides of the fiddle frame at its outer end are connected by a curved band 80 having a centrally disposed hub portion 81 mounted on a stud shaft 82 which is supported in a position slightly inclined from the vertical in suitable bearings in the ends of the two arms 83 and 84, which constitutes a part of the machine frame. Secured to the shaft 82 and resting on said hub is a drum 85 carrying a belt 86 which passes around a smaller drum 87 fixed to the cutting member shaft 60 whereby the rotation of the shaft 82 rotates the shaft 60 at an increased speed. The peripheries of these two drums are provided with notches 88 adapted to receive wires 89 secured to the belt in order to prevent the belt slipping on the drums. The shaft 82 is rotated by means of bevelled gear 90 fixed to that shaft which meshes with a bevelled gear 91 on the end of the main shaft 16.

In order to adjust the cutting member in relation to the work gage, the fiddle frame is swung laterally on the shaft 82 as a pivot and means is provided for locking it in adjusted position. One side of the free end of the frame is extended in the form of a bar 93 which is bored transversely to receive an adjusting screw 94 and a locking screw 95. The adjusting screw is loosely mounted in its bore in the bar 93 and has its end threaded through a bracket 96 on the rear side of the arm 11. A shoulder 97 on the adjusting screw abuts the front face of the bar 93 so that by turning the screw in one direction it pushes the arm 93 inwardly toward the frame arm 11 and when turned in the opposite direction a helical spring 98 pushes the bar 93 outwardly and keeps it in engagement with the shoulder 97. The locking screw 95 which is threaded through the bar 93 and abuts the frame 11 is utilized for forcing the arm tightly against the shoulder 97 on the adjusting screw in order to lock the fiddle frame in its adjusted lateral position.

For locking the pivoted bearing 61 in adjusted position to fix the angular relation of the cutting member to the work, a thumb locking screw 100 is loosely mounted in a slot 101 in the inner end of the outer side of the fiddle frame and is threaded into an extension 102 of the bearing 61. A spring washer 103 is inserted between the expanded portion of the locking screw 100 and the outer face of the fiddle frame side so that by loosening the screw 100 the bearing 61 may be pivotally moved and is locked in any adjusted position by tightening up the locking screw.

The foregoing construction is all old and well known and it will be observed that the angular adjustment of the cutting member is one which is fixed and must be changed when a change is made in the slant or the width of the skiving, which change to be properly made must be done while the machine is at rest. Various forms of work gages have been used with machines of this type, which gages have been adjustable but have been of such construction that the adjustment could be made only while the machine was at rest. In changing from one kind of skiving to another in the use of these machines, these two adjustments were, as a general rule, all the adjustments required to be made.

My invention resides in providing means for changing the angular adjustment of the cutting member, preferably by a foot treadle and in using the same foot treadle for changing the adjustment of the work gage to correspond with the change in the cutting member so that work requiring two different skivings may be completed in one operation without removal from the machine. One form of means for carrying out my invention is hereinafter described, including a particular form of edge gage adapted for longitudinal movement.

The edge gage 23, which is curved to follow the periphery of the feed roll, is formed on one end of a bar extension 105 of a flat plate 106 which is slidably mounted on the top of a right-angled bracket 107. This bracket is provided with a vertical slot 108 whereby it may be vertically adjusted and fastened to a squared portion 109 of the cylindrical portion 26 of the frame of the machine by a screw 110. The top face of the bracket is inclined downwardly from left to right (Fig. 1) so that the gage will be parallel to the inclined portion 31 of the feed roll. The plate 106 is provided with a longitudinal slot 112 through which passes a thumb screw 113 threaded into the top of the bracket and carrying a loose collar 114 overlapping the side edges of the slot. A helical spring 115 between the collar and the head of the screw forces the collar into engagement with the plate to hold it frictionally against longitudinal movement. To retain the collar 114 on the shank of the screw, the upper part of the latter is restricted in diameter. Lateral movement of the plate 106 on the bracket is prevented by a squared tongue 116 on the bracket (Fig. 3) which fits in a longitudinal groove in the plate and serves as a guide therefor.

Carried by the plate 106 is a hold down member 117 which is located beyond the gage 23 for holding down the work. In cross section this member is substantially a quadrant in form presenting its curved portion to the advancing work. In order that it may yield when necessary, the hold down member is formed on the end of a thin spring bar 118 fastened at its further end to the plate 106 by a stud 119 and is held downwardly by a helical spring 120 on an upright screw pin 121 which is fixed in the gage 23 and passes loosely through a hole in the spring bar. The spring abuts at its lower end said bar and at its upper end a nut 122, by the manipulation of which, the pressure exerted by the spring is regulated. An upright chip guard 123, to prevent skivings being thrown onto the work, is mounted on the screw pin 121 and the tail of the guard is held by a finger screw 124 threaded into the spring bar and a spring clip 125 on the screw. The end of this screw abuts the extension 105 and it may be manipulated to raise and lower the hold down member in relation to the work.

The gage carrying plate 106 is longitudinally movable on the bracket 107 for adjustment of the gage, since the spring pressed nut 114 merely holds it frictionally against the bracket but does not prevent movement when force is applied to that end.

For adjusting the gage and cutting member by treadle operated means, I provide a bell-crank lever 130 (Fig. 2), pivotally mounted, within the dome-shaped base 10 of the frame or in any other suitable place, upon a screw 131 threaded into a bracket 132 fastened to the inner face of the base by a bolt 133. This bell-crank lever is held in a normal position with one arm extending upwardly and the other laterally by a wire spring 135 having one end coiled around the screw 131 and the other end bearing upwardly against an ear 136 on the lateral arm of said lever. The latter arm is connected by a rod 137 to a foot treadle (not shown) whereby the bell-crank lever may be moved pivotally in the direction indicated by the arrows in Fig. 2 when downward pressure is applied to the treadle, the spring returning the lever to normal position when the pressure is released. Suitable adjustable connections between the bell-crank lever on the one hand and the gage and cutting members on the other hand are provided for moving these members to change their adjustments and one form of connection comprises a threaded rod having one end formed for detachable connection with the member controlled by it and its other end mounted loosely in a hole in one arm of the bell-crank lever, said rod carrying a pair of sleeves threaded thereon on opposite sides of the lever arm.

For adjusting the cutter member, I use a connection of the above character comprising (Fig. 2) a threaded rod 140 having one end 141 turned laterally to hook into a hole 142 in the free end of a bar 143 fastened to the cutter shaft pivoted bearing 61. The rod passes down vertically through an opening 144 in the base 10 and through a hole 145 in the ear 136 on the horizontal arm of the bell-crank lever. Threaded on the rod are two sleeves 146 and 147, mounted above and below the ear respectively. To facilitate adjustment of the sleeves on the rod by turning, the upper sleeve has at its upper end a knurled annular shoulder 148 and the lower sleeve a similar shoulder 149 at its lower end. A lip 150 at its upper end prevents the sleeve entering the hole in the ear.

By adjusting the two sleeves on the rod 140 the effective movement of the rod when the bellcrank lever is operated by the depression of the treadle can be varied to accomplish the desired change in angular adjustment of the cutting member. To vary the path of adjustment of the cutting member and its location, a pair of adjustable stops 152 and 153 is provided. The first of these is in the form of an adjusting screw, having a knurled head, which screw is threaded through the top of a part 154 of the fiddle frame and bears against the locking screw 100 to limit the upward movement of the cutter shaft bearing 61. A spring 155 under tension attached at one end to a pin 156 in the part 154 and at its other end to the fiddle frame holds the bearing 61 up and the locking screw in engagement with the end of the adjusting screw 152. The other stop 153 is a screw threaded through the bottom of the part 154 to engage said locking screw to limit its downward movement, said stop being held in adjusted position by a spring clip 158. By adjusting stops 152 and 153 the length and location of the path of movement of the cutter shaft bearing can be varied. The connection between the bell crank lever and the cutter shaft bearing is so adjusted that normally the spring 155 holds the inner end of the cutter shaft bearing up and when the treadle is depressed the bearing is turned downwardly to increase the angle between the cutting disk and the work.

For adjusting the gage I use a connection similar to that for the cutting member comprising (Fig. 2) a threaded rod 160 having one end 161 turned laterally to hook into a hole in the stud 119. This rod passes horizontally through an opening in the base 10 and through a hole in the upper end of the vertical arm of the bell-crank 130. Threaded on the rod on opposite sides of the bell-crank arm are two sleeves 163 and 164, the latter sleeve being connected to a helical spring 165 attached at its other end to a screw eyelet 166 threaded into the base 10. To facilitate adjustment of the sleeve 163, it is provided at one end with a knurled head 167 and at its other end with a lip 168 to prevent the sleeve entering the bore in the bell-crank arm. To regulate the length and location of the path of movement of the gage, the plate 106 is provided on each end with an upturned ear 170 into which ears are threaded screw stops 171 and 172, these stops being so arranged as to abut the collar 114 to limit the longitudinal movement of the gage in one direction or the other. The stop screws 171 and 172 are provided with spring clips 173 for holding them in adjusted position. The spring 165 is under tension and holds the connecting rod 160 and the gage retracted, the sleeve 163 serving as a stop therefor. When the treadle is depressed and the upper arm of the bell-crank lever is thereby thrown to the right as shown in Fig. 2, the gage is thrown forward until the stop 171 engages the collar 114. Upon the release of pressure on the treadle, the spring 165 pulls the gage back to normal position as shown in said Fig. 2.

It will be apparent from the foregoing that although the means for regulating the angular adjustment of the cutting member is independent of the means for regulating the longitudinal adjustment of the work gage and the movements of the respective members may differ in length and location yet the connecting means are so constructed as to permit both members to be changed from one position to the other by the operation of a single treadle.

In the use of a machine having my invention applied thereto, the stops for the cutting member and the gage are first adjusted to locate and limit the paths of movement of these members. The stop 152 which determines the normal position of the cutting member is so adjusted that the angle between that member and the work is at the minimum desired, which is the position required for a wide skiving. The other stop 153 is then adjusted so that when the bearing 61 is in engagement therewith, the angle between the cutting member and the work will be at the maximum desired. The sleeves on the rod 140 connecting the bearing 61 with the bell crank lever are then adjusted to effect a movement of the bearing from one stop to the other when the treadle is depressed. Similar adjustments are made of the stops 171 and 172 for the gage which normally is retracted against the stop 172 to give a wide skiving. The stop 171 is adjusted to regulate the forward position of the gage when a skiving of the minimum width is desired. The sleeves on the rod 160 are adjusted in a manner similar to that made for the cutting member. Since the treadle operates both members, any difference in length of the movements of the two members may be compensated for in the adjustment of the sleeves on the connecting rods 140 and 160, so that a depression of the treadle at any time will move each member from one stop to the other.

After the machine has been adjusted, work requiring two types of skiving can be run through in one operation, the machine being changed from one kind of skiving to the other either by pressing down the treadle or releasing it. If the work requires but one kind of skiving, the treadle may be left alone or it may be pressed down and locked, dependent upon the type desired.

One advantage of my machine is that it is adapted for different methods of skiving which is important because those methods differ with different manufacturers. Some manufacturers change the width of the skiving for different purposes but do not change the angular adjustment of the cutting members and others may change the latter member but not the gage. In such cases, the treadle is disconnected from the member which is not changed by merely pulling out the turned end of the connecting rod for that member.

The amount of time saved by elimination of the frequent changing of the adjustments in the ordinary machine under the old method of fixed adjustments and the performance of two different skivings in one operation is a most important factor because it speeds up the work and reduces the cost thereof.

It is to be understood that my invention is not to be limited to the particular form herein shown and described since it may be embodied in other forms within the scope of the following claims.

What I claim is:

1. In a skiving machine, the combination of a cutting member mounted for vertical and angular adjustment in relation to the work, and treadle operated means for changing said angular adjustment at the will of the operator.

2. In a skiving machine, the combination of a cutting member mounted for vertical and angular adjustment in relation to the edge of the work to be skived, and treadle operated means for changing said angular adjustment at the will of the operator and without interfering with the operation of the machine.

3. In a skiving machine, the combination of a cutting member mounted for vertical and angular adjustment in relation to the edge to be skived, and treadle operated means for changing said angular adjustment; said means being adapted to be disconnected and rendered inoperative at the will of the operator.

4. In a skiving machine, the combination of a cutting member mounted for vertical and angular adjustment in relation to the edge to be skived, a pair of stops for limiting its angular adjustment in both directions, a spring for holding said cutting member in one angular adjustment against one of said stops and treadle operated means for moving, at the will of the operator, said cutting member to another angular adjustment against the other of said stops.

5. In a skiving machine, the combination of a work support, a rotary cutter, a shaft for the cutter, a bearing for the shaft, said bearing being tiltable about an axis extending transversely of the shaft axis thereby to permit angular adjustment of the plane of rotation of the cutter relative to the work support, an edge gage mounted for movement transversely of the edge of the work and treadle operated means for changing the adjustment of said shaft bearing and said edge gage simultaneously.

6. In a skiving machine, the combination of a work support, a rotary cutter, means for rotating the cutter, supporting means for the cutter arranged to permit angular adjustment of the plane of rotation of the cutter relative to the work support, an edge gage mounted for movement transversely of the edge of the work, and treadle operated means for changing the adjustment of said cutting member and said edge gage simultaneously; said means being adapted to be disconnected and rendered inoperative at the will of the operator.

7. In a skiving machine, the combination of a work support, a rotary cutter, means for rotating the cutter, supporting means for the cutter arranged to permit angular adjustment of the axis of rotation of the cutter, an edge gage mounted for movement transversely of the edge of the work and treadle operated means for changing the adjustment of the axis of said cutting member and said edge gage simultaneously; said means being adapted to be disconnected from either said cutting member or said edge gage at the will of the operator.

8. In a skiving machine, the combination of a work support, a disk cutter, a rotary shaft carrying the cutter, means for rotating the shaft, the shaft being angularly adjustable in the plane of its axis thereby to vary the plane of rotation of the cutter relatively to the work, a pair of stops for limiting the adjustment in both directions, resilient means for holding said cutting member in one adjustment against one of said stops, an edge gage movable in a direction transverse to the edge of the work, a pair of stops for limiting the movement of said edge gage in both directions, resilient means for holding said edge gage against one of said stops in one adjustment and treadle operated means for moving, at the will of the operator, said cutting member against the other of said first mentioned stops and said edge gage against the other of said second mentioned stops to vary the adjustment of said member and said edge gage.

9. In a skiving machine, the combination of a cutting member mounted for angular adjustment in relation to the work, an edge gage mounted for movement transversely of the edge of the work, adjustable stops for limiting the adjustment of said cutting member and said edge gage in both directions, a bell crank lever connected to said cutting member and said edge gage and a treadle for operating said bell crank lever to change the adjustments of said two members simultaneously.

10. In a skiving machine, the combination of a rotatable cutting member mounted for vertical and angular adjustment in relation to the work, means for adjusting it vertically, a pair of stops for limiting its angular adjustment in both directions, said stops being adjustable to determine the length and location of the path of adjustment of said cutting member, a spring for holding said cutting member normally in one adjustment against one of said stops and treadle-operated means for moving said cutting member to another adjustment against the other of said stops.

11. In a skiving machine, the combination of a rotatable cutting member mounted for vertical and angular adjustment in relation to the work, means for adjusting it vertically, a pair of adjustable stops for limiting the angular adjustment of said cutting member, a spring for normally holding said cutting member in one adjustment against one of said stops, treadle-operated means for moving said cutting member against the other of said stops and a spring for returning said treadle to normal position when the pressure thereon is released.

12. In a skiving machine, the combination of a rotatable cutting member and an edge gage, both being movable for adjustment, a plurality of stops for regulating the length and location of the respective paths of movement for adjustment of said two members and treadle-operated means for changing the adjustment of both said members simultaneously at the will of the operator.

13. In a skiving machine, the combination of a cutting member mounted for vertical and angular adjustment in relation to the work, a pair of stops for limiting its angular adjustment, a spring for holding said member normally in one angular adjustment as determined by one of said stops, a bell-crank lever, an adjustable detachable connection between said lever and said cutting member and a treadle for operating said lever to change the angular adjustment of said cutting member.

14. In a skiving machine, the combination of a pivotally mounted bearing, a shaft rotatably mounted in said bearing and longitudinally adjustable therein, a cutting member fixed on one end of said shaft, a pair of stops for limiting the pivotal movement of said bearing, a spring for normally holding said bearing in engagement with one of said stops and treadle-operated means for moving said bearing pivotally into engagement with the other of said stops to change the angular adjustment of said cutting member in relation to the work.

15. In a skiving machine, the combination of a pivotally mounted bearing, a shaft rotatably mounted in said bearing and longitudinally adjustable therein, a cutting member fixed on one end of said shaft, a pair of stops for limiting the pivotal movement of said bearing, a spring for normally holding said bearing in enagement with one of said stops, a treadle-operated bell-crank lever and an adjustable connection between said lever and said bearing.

16. In a skiving machine, the combination of a pivotally mounted bearing, a shaft rotatably mounted in said bearing, a cutting member fixed on one end of said shaft, a pair of stops for limiting the pivotal movement of said bearing, a spring for normally holding said bearing in engagement with one of said stops, a treadle-operated bell-crank lever and an adjustable connection between said lever and said bearing comprising a threaded rod connected to said bearing and loosely mounted in a bore in one arm of said lever and a pair of sleeves threaded on said rod, one on either side of said arm.

17. In a skiving machine, the combination of a rotatable cutting member mounted for angular adjustment in relation to the work, an edge gage mounted for movement transversely of the edge of the work, a treadle and adjustable connections between said treadle and said cutting member and edge gage to effect a differential adjustment of said members on any movement of said treadle.

18. In a skiving machine, the combination of a rotatable cutting member mounted for angular adjustment in relation to the work, an edge gage mounted for movement transversely of the edge of the work, a treadle and connections between said treadle and said cutting member and edge gage, said connections being adjustable to effect a differential adjustment of said cutting member and edge gage on any movement of said treadle.

19. In a skiving machine, the combination of a pivotally mounted bearing, a shaft rotatably mounted in said bearing and longitudinally adjustable therein, a cutting member fastened on the lower end of said shaft, means for limiting the pivotal movement of said bearing in both directions, a spring for normally holding said bearing in engagement with one of said limiting means, an edge gage mounted for movement transversely of the edge of the work and treadle operated means for moving said bearing pivotally into enagement with the other of said limiting means to change the angular adjustment of said cutting member in relation to the work and for simultaneously changing the adjustment of said edge gage in relation to the work.

FREDERICK S. GLINES.